April 27, 1943.    P. J. SWOFFORD    2,317,864
FABRIC AIR-LESS TIRE
Filed July 3, 1942

Patented Apr. 27, 1943

2,317,864

UNITED STATES PATENT OFFICE 2,317,864

FABRIC AIRLESS TIRE

Peter J. Swofford, Fort Worth, Tex.

Application July 3, 1942, Serial No. 449,626

3 Claims. (Cl. 152—306)

This invention relates to a fabric airless tire, and has for one of its objects the production of a simple and efficient tire which is constructed of a plurality of facing fabric sections which are firmly bound together in the form of a tire, the fabric in each section running in such a way that the wear and shock will be directly against the ends of the sections and fabric in each section.

A further object of this invention is the production of a non-rubber tire formed of a plurality of cotton fabric sections fitting in facing and segmental relation to form a sturdy shock-resisting tire and which possesses a desired resiliency without the necessity of using a pneumatic tube.

Another object of this invention is the production of a simple and efficient cotton fabric tire comprising a plurality of formed fabric segments arranged in radiating relation to form a tire, the segments being secured together and also treated with a proper solution to eliminate friction.

Other objects and advantages of the present invention will appear throughout the following specification and claims.

In the drawing:

Figure 1 is a perspective view of the tire;

Figure 2 is a front view of one of the tire sections, the connecting cables being shown in section;

Figure 3 is an enlarged side elevational view of a series of tire sections or segments, certain parts being shown in section;

Figure 4 is a side elevational view of a portion of the tire;

Figure 5 is a group view of the wrench used for tightening the sections or segments together.

By referring to the drawing, it will be seen that 10 designates the wheel upon which the tire 11 is mounted. The tire 11 comprises a plurality of sections or segments 12 which are arranged in facing contact relation and radiating from the rim of the wheel 10. The segments 12 are made of cotton fabric, the cord and fabric running in such a way that the wear and shock is directly on the ends of the same, as indicated at 13. The tire 11 is built in sections or segments 12 which are about ⅞ of an inch at the outer end, tapering down to a desired thickness, depending upon the size of the tire. The sections or segments 12 are assembled in arch-like form.

The sections or segments 12 are stuck together by means of cement or other adhesive substance at the bottom half 14 thereof, and bottom cables 15 and the central cable 16 are secured in place. The assembled tire may then be fixed securely on the rim when mounted. The sections or segments 12 may be made in various sizes to fit the standard wheel in current use. The top or outer half 17 of each segment 12 is treated with graphite or some other proper solution which is anti-friction. The present tire is specially constructed to provide a proper spring and resiliency and to stand maximum punishment in traffic. The present tire may be used for automobiles and other vehicles including airplanes of all types, tanks and tractors. Since no inflatable tube is used, the danger of collapse is eliminated. The side walls of the tire may be either straight or shaped, as shown in Figure 2.

The cables 15 and 16 which connect the sections or segments and bind the same together in tire form, are insulated with a woven cotton fabric covering 18. The bottom cables 15 are connected by an oppositely internally-threaded nut 19 which engages the oppositely threaded ends of the cables 15. The ends of the cable 16 are connected by a nut 20.

When assembling the sections or segments 12 in tire-like formation, the bottom cables 15 are connected and tightened by means of the knife wrench 21 which may be inserted between two of the segments 12. The cable 16 is then connected and tightened by inserting the knife wrench 21 between two segments 12, as shown in Figures 2 and 3. The sections adjacent the connecting nuts 19 and 20 are then cemented along the bottom half 14, and these cables will firmly and securely brace the segments and assist in holding the tire in a properly assembled relation.

From the foregoing description, it will be seen that my tire is especially adapted to provide a substitute for the universally used rubber tire, and since no rubber is used in the construction of my tire, the same is especially adaptable for use during the present tire shortage, since it is constructed of cotton fabric which material may be easily obtained. The sections will be firmly and securely fastened together at their inner halves and are treated with graphite or other anti-friction material at their outer halves to permit the tire at its tread to freely flex because of this treatment of the closely fitting segments.

It should be understood that certain detail changes in the construction may be employed without departing from the spirit of the invention so long as such changes fall within the scope of the appended claims.

Having described the invention, what I claim as new is:

1. A tire of the class described comprising a plurality of fabric sections shaped to conform to the transverse contour of a tire, said sections being arranged in closely fitting facing relation to provide a tire-like body, means for fixing the lower portions of the sections firmly together, and the outer portion of each section constituting the tread being treated with an anti-friction element.

2. A tire of the class described comprising a plurality of closely fitting fabric segments, the segments tapering inwardly to permit the various segments to snugly fit together in facing relation, the adjoining segments being cemented together near their lower ends, and the outer portion of the segments constituting the tread being treated with an anti-friction solution.

3. A tire of the class described comprising a plurality of closely fitting fabric segments, the segments tapering inwardly to permit the various segments to snugly fit together in facing relation, the adjoining segments being cemented together near their lower ends, and the outer portion of the segments constituting the tread being treated with graphite to eliminate friction.

PETER J. SWOFFORD.